United States Patent
Gordon et al.

(10) Patent No.: US 10,924,578 B2
(45) Date of Patent: Feb. 16, 2021

(54) LATE BINDING OF SOCIAL IDENTITY IN INVITATION MANAGEMENT SYSTEMS

(71) Applicant: MICROSOFT TECHNOLOGY LICENSING, LLC, Redmond, WA (US)

(72) Inventors: Ariel Gordon, Mercer Island, WA (US); Ankur Patel, Sammamish, WA (US); Benjamin R. Vincent, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/366,658

(22) Filed: Mar. 27, 2019

(65) Prior Publication Data

US 2020/0314202 A1    Oct. 1, 2020

(51) Int. Cl.
*G06F 15/16* (2006.01)
*H04L 29/08* (2006.01)

(52) U.S. Cl.
CPC .................. *H04L 67/306* (2013.01)

(58) Field of Classification Search
CPC ..................................................... H04L 67/306
USPC ......................................................... 709/204
See application file for complete search history.

(56) References Cited

U.S. PATENT DOCUMENTS

| | | | | |
|---|---|---|---|---|
| 10,459,953 | B1* | 10/2019 | Ji | G06Q 50/01 |
| 10,614,116 | B2* | 4/2020 | Koolwal | G06F 3/04845 |
| 2011/0208783 | A1* | 8/2011 | Dolphin | G06Q 10/06 707/800 |
| 2014/0207877 | A1* | 7/2014 | Kandaswamy | H04L 51/24 709/206 |
| 2014/0280583 | A1 | 9/2014 | Banatwala et al. | |
| 2016/0063226 | A1* | 3/2016 | Singh | G06F 21/31 726/3 |
| 2016/0366145 | A1* | 12/2016 | Raghavendra | H04L 67/306 |

OTHER PUBLICATIONS

"International Search Report and Written Opinion Issued in PCT Application No. PCT/US20/015764", dated Apr. 9, 2020, 11 Pages.

* cited by examiner

*Primary Examiner* — Frantz B Jean
(74) *Attorney, Agent, or Firm* — Workman Nydegger

(57) ABSTRACT

Performing late binding of a social network identification (ID) to a guest ID for use in an identity platform. A guest ID is created for a second user that gives access to a shared application of an identity platform that is associated with a first user. Subsequent to creating the guest ID, permission is requested from the second user to bind social network IDs of social networks of which the second user is a member to the guest ID. In response to receiving permission, binding the social network IDs to the guest ID is performed. The binding gives the identity platform access to profile attributes of the second user from the social networks, and allows it to write information such as a merit badge back on the second user's social network profile. A federation binding may also be created that allows the second user to sign into the shared application using their social network ID.

20 Claims, 4 Drawing Sheets

LATE BINDING OF SOCIAL IDENTITY IN INVITATION MANAGEMENT SYSTEMS

BACKGROUND

Computing systems and associated networks have greatly revolutionized our world. One of the key benefits obtained from computing systems is the ability to access resources over a network. This typically requires that a user who desires to access the resources over the network be given permission to access the resources by a system such as an identity platform that controls the resource. One way that such permission is given is by the identity platform to "invite" a user. The user may then redeem the invitation to gain access.

In one implementation the identity platform implements a Social identity (ID) Federation into its invitation feature set. This effectively allows the inviter to easily send sharing invitations to members of their social network, and it allows invitees to redeem invitations with their Social ID, sign in with their Social ID, and enable bi directional sharing of data between their social network and the resource that they have been invited to access.

However, introducing Social ID federation into a sharing experience introduces significant complexity for inviters and invitees alike. Typical implementations result in what is commonly referred to as a "NASCAR" experience because of the number of potential Social IDs that may be presented to the invitee. The name comes from the similarity with NASCAR cars and uniforms, which are plastered with logos from competing brands. In addition to the UI degradation, this approach introduces complexity for the invitees who need to remember which Social ID they choose to redeem an invitation. If they redeem using one Social ID and try to login using a different Social ID because they forgot which Social ID was originally used, they will likely not be able to access the resource.

In addition, it introduces complexity to the inviters. For example, if the inviter and the invitee are members of more than one social network, it may be confusing for the inviter to choose which social network to use when making the invite.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments disclosed herein are related to computing systems, computer program products, and methods for performing late binding of a social network identification (ID) to a guest ID for use in an identity platform. A guest ID is created for a second user. The guest ID gives the second user access to a shared application of an identity platform that is associated with a first user. Subsequent to creating the guest ID, permission is requested from the second user to bind social network IDs of social networks of which the second user is a member to the guest ID. In response to receiving permission from the second user, binding the social network IDs to the guest ID is performed. The binding gives the identity platform access to profile attributes of the second user from the social networks of which the second user is a member.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
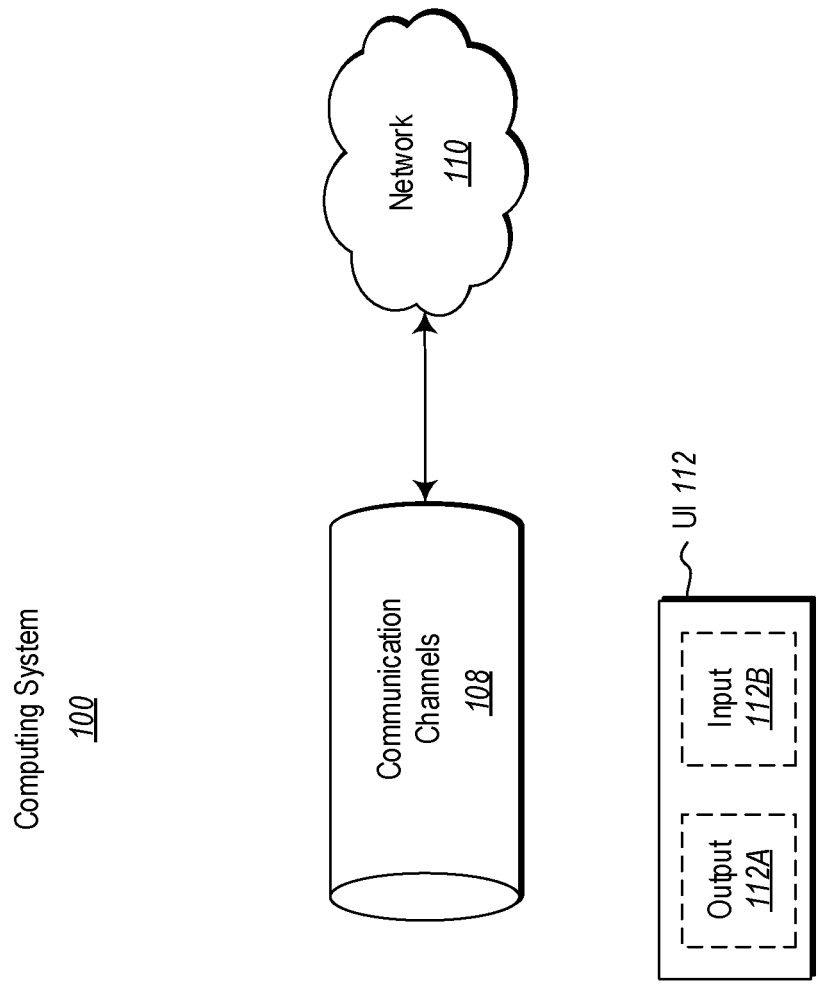
FIG. 1 illustrates an example computer system in which the principles described herein may be employed.

Embodiments disclosed herein are related to computing systems, computer program products, and methods for performing late binding of a social network identification (ID) to a guest ID for use in an identity platform. A guest ID is created for a second user. The guest ID gives the second user access to a shared application of an identity platform that is associated with a first user. Subsequent to creating the guest ID, permission is requested from the second user to bind social network IDs of social networks of which the second user is a member to the guest ID. In response to receiving permission from the second user, binding the social network IDs to the guest ID is performed. The binding gives the identity platform access to profile attributes of the second user from the social networks of which the second user is a member.

The embodiments disclosed herein provide various technical advances over conventional systems. For example, the first user is able to see the second user through a rich user profile, including for example a picture pulled from the social network of the second user, which would otherwise be absent. The first user also does not have to wonder which social network to use to invite the second user to have access to the shared application, which may save on processing resources as only one invitation is needed. The second user is able to choose how he or she would like to log into the shared resource without being limited by the initial invitation. In addition, the second user no longer needs to remember which identity was used for redemption of the invitation and then use the same identity for subsequent logins. This may also provide the practical benefit of saving processing resources as less failed logins should result. Finally, the second user is able to received verified claims from the first user about tasks he or she has performed that may be placed in the social networks of the second user for others to see. All of these technical advances and advantages will be further explained and become clearer in the embodiments disclosed herein.

Because the principles described herein operate in the context of a computing system, a computing system will be described with respect to FIG. 1. Then, the principles of automated selection of identity provider to use to authenticate a user will be described with respect to FIGS. 2 through 3.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The processing unit 102 may include a general purpose processor and may also include a field programmable gate array (FPGA), an application specific integrated circuit (ASIC), or any other specialized circuit. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard coded or hard wired logic gates. The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2A:
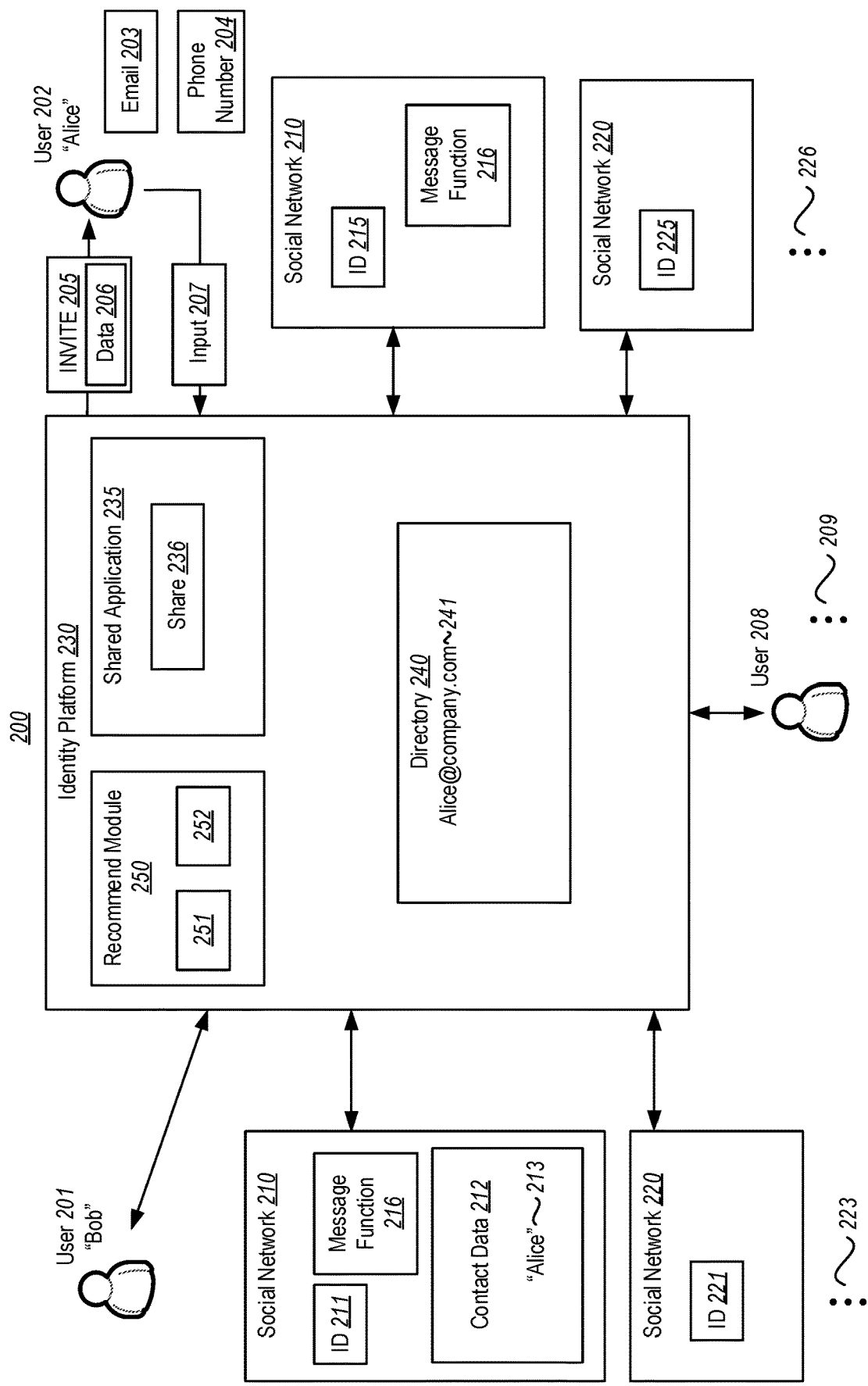
FIGS. 2A and 2B illustrate an example environment in which a late binding between a social network identification (ID) and a guest ID of an identity platform may be generated.
Figure 2B:
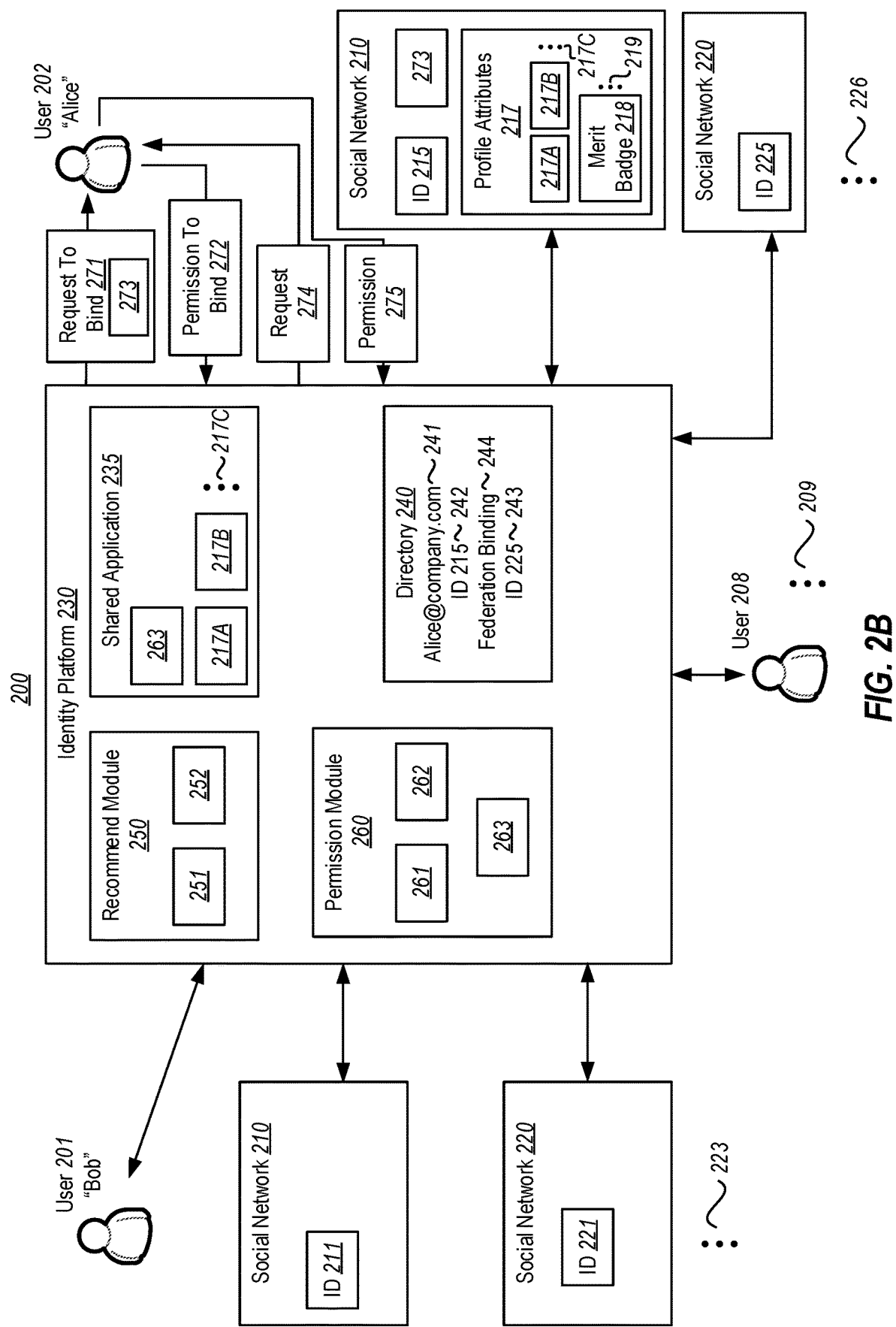

FIGS. 2A and 2B illustrate an environment 200 of an invitation management system in which the principles described herein may be employed. As illustrated, the environment 200 may include a first user 201, also referred to herein as "Bob". In an embodiment, Bob 201 may be a member of or otherwise associated with a social network 210 and a social network 220. Accordingly, Bob 201 may have a social network identification (ID) 211 that represents Bob 201's membership account in the social network 210 and that allows Bob 201 to login into (with an associated password or the like) and to otherwise access and interact with the functions of the social network 210. Likewise, Bob 201 may have a social network ID 221 that represents Bob 201's membership account in the social network 220 and that allows Bob 201 to login into (with an associated password or the like) and to otherwise access and interact with the functions of the social network 220. The ellipses 223 represent that Bob 201 may be a member of or otherwise associated with any number of additional social networks.

The environment 200 may also include a second user 202, also referred to herein as "Alice". In an embodiment, Alice 202 may be a member of or otherwise associated with the social network 210 and the social network 220, which are the same social networks that Bob 201 is a member of. Accordingly, Alice 202 may have a social network ID 215 that represents Alice 202's membership account in the social network 210 and that allows Alice 202 to login into (with an associated password or the like) and to otherwise access and interact with the functions of the social network 210. Likewise, Alice 202 may have a social network ID 225 that represents Alice 202's membership account in the social network 220 and that allows Alice 202 to login into (with an associated password or the like) and to otherwise access and interact with the functions of the social network 220. The ellipses 226 represent that Alice 202 may be a member of or otherwise associated with any number of additional social networks, which may be the same as Bob 201's additional social networks 223 or which may be different from the social networks 223. Examples of the social networks 210, 220, 223, and 226 may include LinkedIn, GitHub, Facebook, Google, UpWorks, and the like. It will be appreciated that the principles disclosed herein are not limited to any specific type of social network and thus the principles disclosed herein may work with any social network as circumstances warrant.

The environment 200 may also include an identity platform 230. In an embodiment, the identity platform 230 may be associated with a company that Bob 201 works for. For example, suppose that Bob 201 works for a company called "Contoso". In such case, the identity platform 230 may be an Office platform (Contoso.Office.com), a SharePoint platform (Contoso.Sharepoint.com), or a Visual Studio platform (Contoso.VisualStudio.com). Of course, the identity platform 230 may be any other reasonable identity platform associated with Contoso or Bob 201 as circumstances warrant.

The identity platform 230 may include a shared application or resource 235. The shared application 235 is considered a "shared application" because it is an application or resource that is able to be used by more than one user in a collaborative manner. For example, as shown in FIG. 2A Bob 201, a user 208, and potentially any number of additional users as represented by the ellipses 209 may be able to use the shared application 235 in the collaborative manner. In the embodiment, if the identity platform 230 is Office platform or a SharePoint platform, then perhaps the shared application 235 may a Word document, an Excel spreadsheet, a PowerPoint presentation or the like. If the identity platform 230 is a Visual Studio platform, then perhaps the shared application 235 may be a computer program code or the like.

In an embodiment, Bob 201 may desire that Alice 202 gain access to the shared application 235. For example, Bob 201 may be working on a contract for Contoso and knows from social network 210 or 220 that Alice 202 is an attorney that specializes in contracts. In such case, the shared application 235 may a Word document that includes the text of the contract. Alternatively, Bob 201 may be working on computer programming code and knows from social network 210 or 220 that Alice 202 is a software engineer who is able to help write the code. In such case, the shared application 235 may be computer program code.

Accordingly, in some embodiments the shared application 235 may include a share UI element 236. In operation, Bob 201 may select the share UI element 236. This action may then trigger that an invite 205 be sent to Alice 202 to thereby give Alice 202 access to the shared application 235 so that she can work with Bob 201 (and potentially user 208 and users 209) in a collaborative manner. Although the share UI element 236 is shown as being part of the shared application 235, this need not be the case as the share UI element 236 may be included in a different part of the identity platform 230 as circumstances warrant.

For example, suppose that Alice 202's email address 203 is Alice@company.com. In one embodiment, this email address 203 may be entered into the identity platform 230 by Bob 201 or by some other user. The identity platform 230 may then generate the invitation 205 and send it to the email address 203 Alice@company.com upon Bob 201 selecting the share UI element 236.

In some embodiments, the invitation 205 may include data 206 that may be used by Alice 202 to gain access to the shared application 235 by helping to prove the identity of Alice 202. For example, the data 206 may include a code or the like that Alice 202 may then send back to the identity platform 230 to show that she received the invite and should be given access. This is an example of an input 207 that is received by the identity platform 230 to show that Alice 202 has used the data 206 to access the shared application 235. In some embodiments, an additional code may be round tripped between the identity platform 230 and Alice 202 to further verify the identity of Alice 202.

In other embodiments, the data 206 may include a link to the shared application 235. Alice 202 may activate the link to gain access to the shared application 235. This is also an example of an input 207 that is received by the identity platform 230 to show that Alice 202 has used the data 206 to access the shared application 235. It will be appreciated that the data 206 may include other types of data besides the code or link discussed previously.

In another embodiment, Alice 202 may have a mobile phone number 204. The mobile phone number 204 may be entered into the identity platform 230 by Bob 201 or by some other user. The identity platform 230 may then generate the invitation 205 and send it to the mobile phone number 204 as a text message (SMS) upon Bob 201 selecting the share UI element 236. Alice 202 may then use the data 206 included in the SMS invitation 205 in the manner previously described in relation to the email address 203.

In one embodiment, the identity platform 230 may have access to Bob 201's social network 210, social network 220 and potentially any of the additional social networks 223. Accordingly, the identity platform 230 may access contact data that is associated with one or more of the social networks to determine contact information for Alice 202 such as the email address 203 and/or the mobile phone number 204. For example, the social network 210 may include contact data 212. As previously mentioned, both Bob 201 and Alice 202 may both be members of the social network 210. Accordingly, the contact data 212 may include the contact information for Alice 202 as shown at 213. This contact information may then be used by the identity platform 230 in relation to generating and sending the invitation 205 in the manner previously described.

In another embodiment, the various social networks may have a built in message function that allows members of the social network to send messages to each other. For example, the social network 210 may include a message function 216. Accordingly, the identity platform 230 may utilize Bob 201's message function 216 to contact Alice 202 using her message function 216 upon Bob 201 selecting the share UI element 236. The message function 216 may then be used by identity platform 230 in relation to generating and sending the invitation 205 in the manner previously described. Accordingly, the principles disclosed herein provide for multiple ways to contact Alice 202 in relation to the invitation 205. That is, it will be appreciated that email, SMS, and social network messaging are only non-limiting examples of the many ways that that the identity platform 230 may provide the invitation 205 to Alice 202.

As illustrated, in some embodiments Bob 201 and Alice 202 may both be members of social networks 210 and 220. In such embodiments, Bob 201 may wonder which social network should be used in relation to the invitation 205. Accordingly, in such embodiments the identity platform 230 may include a recommendation module 250. In operation, the recommendation module 250 may be able to recommend to Bob 201 which of social network 210 and social network 220 should be used upon Bob 201 selecting the share UI element 236.

In one embodiment, the recommendation module 250 may make the recommendation based on an affinity 251 between the social network and the shared application 235. For example, suppose that the social network 210 is LinkedIn and the social network 220 is GitHub and that the shared application 235 is the Word document including the contract discussed previously. Accordingly, the recommendation module 250 may determine that LinkedIn has a greater affinity 251 to the Word document contract than GitHub does. Thus, the recommendation module 250 may recommend that Bob 201 have the identity platform use social network 210 LinkedIn in relation to invitation 205 and in binding the social network ID 215 of Alice 202 to the guest ID 241 as will be described in more detail to follow.

Similarly, suppose that social network 210 is LinkedIn and social network 220 is GitHub and that the shared application 235 is Visual Studio code discussed previously. Accordingly, the recommendation module 250 may determine that GitHub has a greater affinity 251 to the Visual Studio code. Thus, the recommendation module 250 may recommend that Bob 201 have the identity platform use social network 220 GitHub in relation to invitation 205 and in binding the social network ID 225 of Alice 202 to the guest ID 241 as will be described in more detail to follow.

In other embodiments, the affinity 251 may be part of a preference based on the shared application 235. For example, a Word document may have a preference of LinkedIn, UpWorks, and Facebook in that order. The Visual Studio code, on the other hand, may have a preference for GitHub, Google, and LinkedIn in that order. Accordingly, the recommendation module 250 may make a recommendation to Bob 201 based on the preference of the shared application 235.

In further embodiments, there may not be a clear affinity 251 between a social network and the shared application 235. For example, suppose in the case of the Word document that is the contract that Bob 201 and Alice 202 were both members of LinkedIn and Facebook and that both of these social networks equally described Alice 202 as an attorney who specialized in contracts. In such embodiments, the recommendation module 250 may generate a list 252 of possible social networks to use. In the illustrated embodiment, the list 252 would include both LinkedIn and Facebook. Bob 201 would then be able to select which of the social networks should be used upon Bob 201 selecting the share UI element 236.

Regardless of the manner that the invitation 205 is provided to Alice 202 (i.e., email, SMS, social network messaging, etc.), the identity platform 230 may receive the input 207 that indicates that Alice 202 has used the data 206 to gain access to the shared application 235. Accordingly, the identity platform 230 may create a guest ID 241 for Alice 202 in a directory 240. The guest ID 241 may be an account representation for Alice 202 in the identity platform 230 that associates Alice 202 with shared application 235 and may then be used by Alice 202 to log into or otherwise access the shared application 235. As illustrated in FIG. 2A, the guest ID 241 is shown for Alice 202's email address 203 Alice@company.com. Thus, Alice 202 will be able to log into the shared application 235 using her email address 203. However, it will be appreciated that the guest ID 241 may also be her phone number 204 or some other representation as circumstances warrant.

As discussed previously, there may be a number of users (i.e., Bob 201, user 208, and users 209) that are able to use the shared application 235 in a collaborative manner. Accordingly, once Alice 202 has been given access to the shared application 235 by the creation of the guest ID 241 in the manner described, it may be advantageous if the other users of the shared application 235 are able to view certain profile information about Alice 202. For example, it may be helpful if the other users are able to view a picture of Alice 202 or to view other relevant information about her such as her experience in working on projects similar to the shared application 235.

Advantageously, the principles disclosed herein provide a way for the shared application 235 to access profile information from a social network of Alice 202 and then to display this information in the shared application 235. This process will now be explained with particular attention to FIG. 2B. FIG. 2B illustrates an additional view of the environment 200 and thus does not include all the elements of the environment 200 shown in FIG. 2A.

As illustrated in FIG. 2B, Alice 202's membership account in the social network 210 may include profile attributes 217 including profile attribute 217A, 217B, and any number of additional profile attributes as illustrated by the ellipses 217C. As mentioned previously, the profile attributes 217 include information about Alice 202. For example, the profile attribute 217A may be a picture of Alice 202 while the profile attribute 217B may be a listing of her educational or work experience, a listing of relevant contact information, or a listing of professional organizations Alice 202 belongs to. Accordingly, the principles disclosed herein are not limited to any particular type of profile attributes 217. Although not illustrated, Alice 202's membership account in the social network 220 (and potentially any of the social networks 226) may also include profile attributes.

As mentioned, Alice 202 may use the guest ID 241 to log into or otherwise access the shared application 235. She may continue to do so for as long as the guest ID 241 is active in the directory 240. However, in order to access the profile attributes 217, the identity platform 230 may generate a request to bind 271 Alice 202's social network ID 215 of the social network 210 to the guest ID 241.

It will be appreciated that the request 271 is generated subsequent to the creation of the guest ID 241. That is, the request 271 is not generated at the time that the invitation 205 is sent, but is only generated after the guest ID 241 has been created. This advantageously simplifies the process for Alice 202 as she does not have to worry about her social network IDs at the time she first is invited to gain access to the shared application 235 since the social network IDs are not used in the initial process. This results in a low friction invitation 205 redemption experience for Alice 202.

Accordingly, the identity platform 230 may include a permission module 260 that is used in generating the request to bind 271. In one embodiment, the permission module 260 may specify how long after the creation of the guest ID 241 the request to bind 271 should be triggered. In one embodiment, the permission module 260 may specify that the request to bind 271 should be triggered after a given amount of time 261. For example, the given of amount or length of time 261 may specify that the request to bind 271 be triggered after N number of days or weeks. For instance, perhaps after two days or one week. It will be appreciated that the amount or length of time 261 should be selected as a reasonable amount of time so that the users may benefit from the access to the profile attributes 217. For instance, it would be less beneficial if the amount or length of time 261 were set to longer than the expected collaborative effort using shared application 235.

In another embodiment, the permission module 260 may specify that the request to bind 271 should be triggered after a given usage amount 262. For example, the given usage amount 262 may specify that that the request to bind 271 be triggered after N number of times that Alice 202 logs into the shared application 235 using the guest ID 241. For instance, perhaps after two or five logins. Again, the given usage amount 262 should be a reasonable amount that is beneficial to the users of the shared application 235.

Alternatively, the given amount of usage 262 may be based on the number of users (i.e., Bob 201, user 208, and users 209) that are also using the shared application 235 in addition to Alice 202. For example, if only Bob 201 and Alice 202 are using the shared application 235, then perhaps there may not be a need to access the profile attributes 217, especially in the case that where Bob 201 already well knows Alice 202. However, if the number of users using the shared application 235 is more than three, then perhaps the permission module 260 may specify that the request to bind 271 should be triggered since the additional user may not know Alice 202.

In one embodiment, the permission module 260 may direct the shared application 235 to provide a prompt 263 to Alice 202 to trigger the request to bind 271. If Alice 202 responds to the prompt 263, then the request 271 is triggered. For example, suppose that Bob 201, user 208, and three users 209 are all using the shared application 235 in the collaborative manner. In such case, the shared application 235 may provide a prompt 263 in the form of a pop up message or other UI element that recommends to Alice 202 that she allow her social network 210 and/or 220 to be accessed by the shared application 235 so that her profile attributes 217 may be accessed. The prompt 263 may also explain the benefits of allowing such access. If Alice 202 responds to the prompt 263, the request to bind 271 may be triggered.

Once the request to bind 271 has been triggered subsequent to the creation of the guest ID 241, the request may be provided to Alice 202. The request to bind 271 may ask Alice 202 is she consents to having her social network ID 215 and thus her membership account in the social network 210 associated with the identity platform 230 and the shared application 235. In one embodiment, the request to bind 271 may include a consent prompt 273 from the social network 210 that asks Alice 202 to approve access of her account in the social network 210 to the identity platform 230.

In the embodiments where the request to bind 271 includes the consent prompt 273 from the social network 210, it may often be necessary for Alice 202 to already be logged into the social network 210 so that she is authenticated by the social network. If Alice 202 is not already logged into the social network 210, a login prompt from the social network 210 will typically be presented to Alice 202. Responding to this login prompt may be an inconvenience for Alice 202. Accordingly, in one embodiment the identity platform 230 may contact the social network 210 to let the social network 210 know that it has already verified Alice 202's login information such as the email address 203 or the phone number 204. If there is a high enough level of trust between the social network 210 and the identity platform 230, the social network 210 may accept the verification done by the identity platform 230 and skip presenting the login prompt to Alice 202.

Alice 202 may retain the right to accept or reject the request to bind 271. For example, Alice 202 may reject the request to bind 271 for any reason such as she does not feel comfortable giving the identity platform 230 access to her membership account in the social network 210. If she rejects the request 271, then she will continue to have access to the shared application 230 for as long as the guest ID 241 is active in the directory 240.

As shown at 272, however, Alice 202 may accept the request 271 and give permission to bind her social network ID 215 to the guest ID 241, thus approving associating her membership account in the social network 210 with the identity platform 230. Accordingly, the identity platform may create a binding 242 between the social network ID 215 and the guest ID 241 in the directory 240.

The binding 242 may give the identity platform 230 permission to access the profile attributes 217 as needed. For example, the identity platform 230 may access the profile attribute 217A that is a picture of Alice 202. The profile attribute 217A may then be displayed in the shared application 235. This will allow Bob 201, user 208, and any of the other users 209 to view the picture of Alice 202. As will be appreciated, being able to see what Alice 202 looks likes may help in the collaboration between the users of the shared application 235 as it may make them feel more like a team. Although not shown, pictures of the other users may also be accessed and displayed in the shared application 235 in a manner similar to that of the picture of Alice 202.

The identity platform 230 may also access additional profile attributes such as profile attribute 217B and any number of additional profile attributes 217C. As described above, the profile attributes 217B and 217C may provide additional information about Alice 202 that may be helpful to the collaborative efforts of the users of the shared application 235. The profile attributes 217B and 217C may also be displayed in the shared application 235.

In some embodiments, a binding may be created between the guest ID 241 and more than one of Alice 202's social network IDs. For example, as shown in FIG. 2B, a binding 243 may be created between the guest ID 241 and the social network ID 225 of the social network 220. This binding may be created in the manner previously described for the binding 242. Although not illustrated, a binding may be created between the guest ID 241 and any number of social network IDs of the additional social networks 226.

Although the binding 242 is able to allow the identity platform 230 to access the profile attributes 217, the binding 242 may not allow Alice 202 to login to or otherwise access the shared application 235 using her social network identity 215. In other words, Alice 202 may still have to use the guest ID 241 to access the shared application 235. Accordingly, in some embodiments the identity platform 230 may generate a federation binding 244 between the guest ID 241 and the social network ID 215. A federation binding is a binding that will allow Alice 202 to use her social network IDs to access the shared application 230.

For example, the identity platform 230 may send a request 274 to Alice 202 requesting her permission to create the federation binding 244. If Alice 202 accepts the request 274, she may provide permission 275 to the identity platform 230. In response, the identity platform 230 may create the federation binding 244.

Once the federation binding 244 is created between the guest ID 241 and the social network ID 215, Alice 202 may be able to subsequently login to the shared application 235 using only the social network ID 215. In other words, Alice 202 would no longer have to use the guest ID 241 (although she would still be able to if desired) to login into the shared application 235 as the social network ID 215 would be sufficient for the login. Thus, Alice 202 is able choose how to login to the shared application 205.

This advantageously provides a single login or sign on from the social network 210 to the shared application 235. In some embodiments, a listing of shared applications such as shared application 235 may be shown in the social network 210. This would allow Alice 202 the ability to access these shared applications from any device she used to access the social network 210.

As discussed previously, the binding 242 allows the identity platform 230 to access and display the profile attributes 217 of Alice 202. However, in some embodiments the binding 242 may also allow the identity platform 230 to write back an indication, such as a merit badge 218, in the profile attributes 217 or some other area of the social network 210 that Alice 202 has performed a specific task. For example, in the embodiment discussed above where Alice 202 is an attorney helping to work on a contract, the identity platform 230 may write a merit badge 218 that says "Alice 202 worked on legal contracts for Contoso from this date to that date." Alternatively, in the embodiment discussed above where Alice 202 is helping to write computer code, the identity platform 230 may write a merit badge 218 that says "Alice 202 worked on writing computer code for Contoso from this date to that date." As shown by the ellipses 119, any number of merit badges for any number of achievements may be written the social network 210 on Alice 202's behalf.

The ability for the identity platform 230 to write the merit badges 218 and 219 provides a significant benefit for Alice 202. For example, when the merit badge 218 is written by the identity platform 230, the merit badge may be considered a signed or verified claim from the recipient of the work. In other words, in the embodiments it is Contoso that is providing the merit badges to the social network 210. Accordingly, any user reviewing the profile attributes 217 in the future will see that the description of completing the task comes from Contoso and not just from Alice 202. This will likely be much more persuasive to future users that Alice 202 is qualified to perform the task, such as drafting the contract or writing the computer code, than if Alice 202 had generated the merit badges 218 and 219 by herself.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed. Furthermore, the outlined method acts are only provided as examples, and some of the method acts may be optional, combined into fewer steps and operations, supplemented with further method acts, or expanded into additional method acts without detracting from the essence of the disclosed embodiments.

Figure 3:
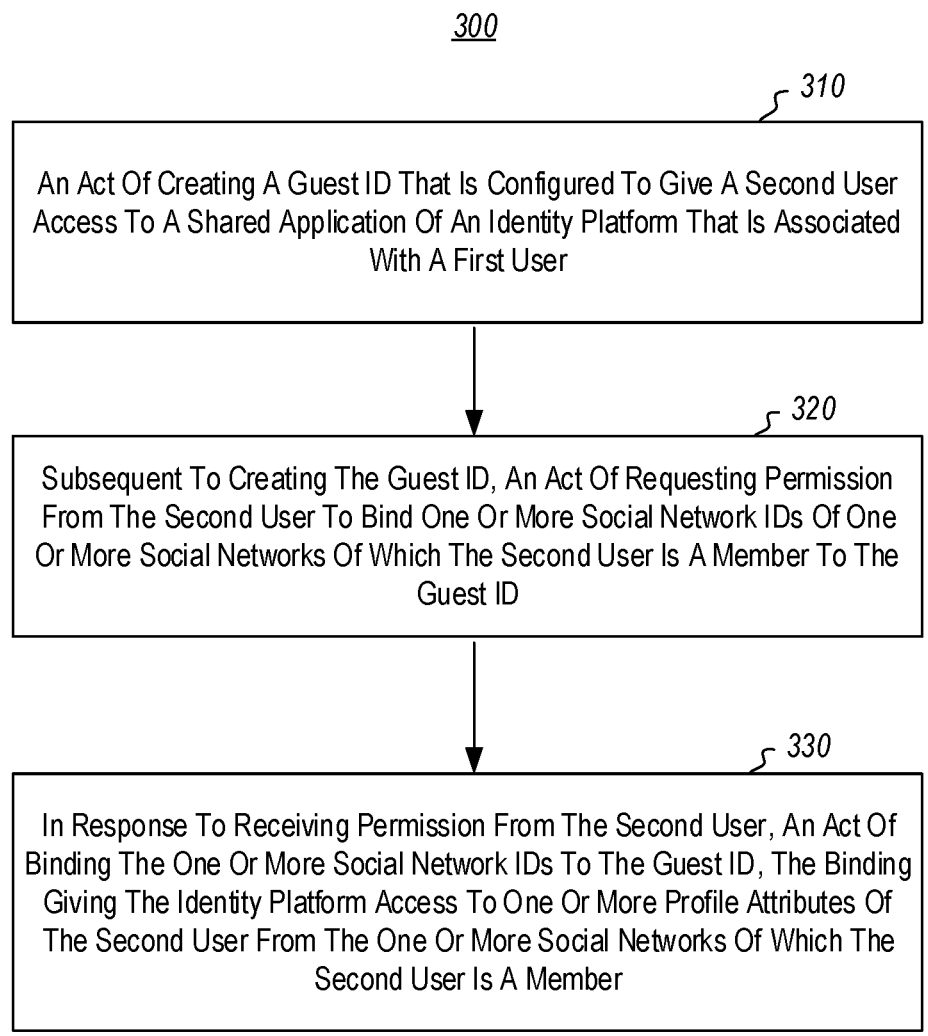
FIG. 3 illustrates a flow chart of an example method for performing late binding of a social network ID to a guest ID for use in an identity platform.

FIG. 3 illustrates a flow chart of an example method 300 for performing late binding of a social network identification (ID) to a guest ID for use in an identity platform. The method 300 will be described with respect to FIGS. 2A and 2B discussed previously.

The method 300 includes an act of creating a guest ID that is configured to give a second user access to a shared application of an identity platform that is associated with a first user (act 310). For example, as previously described the identity platform 230 may be associated with a company (i.e., Contoso) that Bob 201 works for. The identity platform 230 may be an Office platform (Contoso.Office.com), a SharePoint platform (Contoso.Sharepoint.com), or a Visual Studio platform (Contoso.VisualStudio.com). The identity platform 230 may create the guest ID 241 for Alice 202. The guest ID 241 may allow Alice 202 to access the shared application 235.

The method 300 includes, subsequent to generating the guest ID, an act of requesting permission from the second user to bind one or more social network IDs of one or more social networks of which the second user is a member to the guest ID (act 320). For example, as previously described the identity platform 230 may send the request to bind 271 to Alice 202 to bind the social network ID 215 of the social network 210 or the social network ID 225 of the social network 220 to the guest ID 241.

The method 300 includes, in response to receiving permission from the second user, an act of binding the one or more social network IDs to the guest ID (act 330). The binding may give the identity platform access to one or more profile attributes of the second user from the one or more social networks of which the second user is a member. For example, as previously described the identity platform 230 may receive the permission to bind from 272 from Alice 202. In response, the identity platform 230 may generate the binding 242 between the guest ID 241 and the social network ID 215. The binding may give the identity platform 230 access to the profile attributes 217 of Alice 202 in the social network 210.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more processors; and
   one or more computer-readable media having stored thereon computer-executable instructions that are structured such that, when executed by the one or more processors, cause the computing system to perform the following:
   create a guest identification (ID) that is configured to give a second user access to a shared application of an identity platform that is associated with a first user; and
   subsequent to creating the guest ID,
      determine that the guest ID is associated with one or more social network user IDs of one or more social networks of which the second user is a member, each of the one or more social networks or the identity platform maintaining a separate set of user data corresponding to a separate set of user IDs; and
      in response to receiving permission from the second user, bind at least one of the one or more social network user IDs of at least one of the one or more social networks to the guest ID of the identity platform, the binding giving the first user of the identity platform access to one or more profile attributes of the second user associated with the at least one social network user ID of the at least one social network of which the second user is a member.

2. The computing system of claim 1, wherein creating the guest ID comprises:
   sending an invitation from the first user to the second user to gain access to the shared application, the invitation including data that is to be used by the second user to access the shared application;
   receiving input that indicates that the second user has used the data in the invitation to access the shared application; and
   in response to receiving the input, associating the shared application with the second user via the guest ID.

3. The computing system of claim 2, wherein the invitation is sent via one or more of an email address of the second user, a telephone number of the second user via SMS, or a built in messaging function of the one or more social networks of which the second user is a member.

4. The computing system of claim 2, wherein the first user is a member of the one or more social networks that the second user is a member of and the first and second users are associated with each other in the one or more social networks, further comprising:
an act of using contact information of the first user in the one or more social networks to determine an email address or phone number for the second user.

5. The computing system of claim 1 wherein the first user is a member of the one or more social networks that the second user is a member of and the first and second users are associated with each other in the one or more social networks, further comprising:
an act of determining which of the one or more social network IDs to bind to the guest ID based on a type of the shared application or a preference of the shared application.

6. The computing system according to claim 1, further comprising:
an act of obtaining the one or more profile attributes of the second user from the one or more social networks of which the second user is a member; and
an act of displaying the one or more profile attributes to one or more users including the first user.

7. The computing system according to claim 1, further comprising:
an act of writing an indication that the second user has performed a specific task related to the shared application in the profile attributes of the one or more social networks of which the second user is a member.

8. The computing system according to claim 1, further comprising:
an act of generating a federation binding between the guest ID and the one or more social network IDs to thereby allow the second user to log into the shared application using the one or more social network IDs.

9. The computing system according to claim 1, wherein in response to determining that the guest ID is associated with one or more social network user IDs of one or more social networks of which the second user is a member, the computing system is further caused to request permission from the second user to bind at least one of the one or more social network user IDs.

10. The computing system according to claim 9, wherein requesting permission from the second user to bind the at least one of the one or more social network user IDs is initiated based on at least one of: (1) the passage of a given amount of time, or (2) an amount of usage of the guest ID to access the shared application.

11. The computing system according to claim 9, wherein requesting permission from the second user to bind the one or more social network IDs is initiated based on a prompt initiated by the shared application.

12. A method for performing late binding of a social network identification (ID) to a guest ID for use in an identity platform, the method comprising:
creating a guest identification (ID) that is configured to give a second user access to a shared application of an identity platform that is associated with a first user; and
subsequent to creating the guest ID,
determining that the guest ID is associated with one or more social network user IDs of one or more social networks of which the second user is a member, each of the one or more social networks or the identity platform maintaining a separate set of user data corresponding to a separate set of user IDs; and
in response to receiving permission from the second user, binding at least one of the one or more social network user IDs of at least one social network to the guest ID of the identity platform, the binding giving the first user of the identity platform access to one or more profile attributes of the second user associated with the at least one social network user ID of the at least one social network of which the second user is a member.

13. The method of claim 12, wherein creating the guest ID comprises:
sending an invitation from the first user to the second user to gain access to the shared application, the invitation including data that is to be used by the second user to access the shared application;
receiving input that indicates that the second user has used the data in the invitation to access the shared application; and
in response to receiving the input, associating the shared application with the second user via the guest ID.

14. The method of claim 13, wherein the data included in the invitation is one of a code for accessing the shared application or a link to the shared application.

15. The method of claim 12, wherein the first user is a member of the one or more social networks that the second user is a member of and the first and second users are associated with each other in the one or more social networks, further comprising:
determining which of the one or more social network IDs to bind to the guest ID based on a type of the shared application or a preference of the shared application.

16. The method of claim 12, further comprising:
obtaining the one or more profile attributes of the second user from the one or more social networks of which the second user is a member; and
displaying the one or more profile attributes to one or more users including the first user.

17. The method of claim 12, further comprising:
writing an indication that the second user has performed a specific task related to the shared application in the profile attributes of the one or more social networks of which the second user is a member.

18. The method of claim 12, further comprising:
generating a federation binding between the guest ID and the one or more social network IDs to thereby allow the second user to log into the shared application using the one or more social network IDs.

19. The method of claim 12, wherein:
the method further comprises in response to determining that the guest ID is associated with one or more social network user IDs of one or more social networks of which the second user is a member, requesting permission from the second user to bind the one or more social network IDs, and
the request of permission is initiated based on at least one of the following: (1) one or more of the passage of a given amount of time, (2) an amount of usage of the guest ID to access the shared application, or (3) a prompt initiated by the shared application.

20. A computer program product comprising one or more computer-readable hardware storage media having stored thereon computer-executable instructions that are structured such that, when executed by one or more processors, cause a computing system to perform the following:

create a guest identification (ID) that is configured to give a second user access to a shared application of an identity platform that is associated with a first user; and subsequent to creating the guest ID, determine that the guest ID is associated with one or more social network user IDs of one or more social networks of which the second user is a member, each of the one or more social networks or the identity platform maintaining a separate set of user data corresponding to a separate set of user IDs; and in response to receiving permission from the second user, bind at least one of the one or more social network user IDs of at least one of the one or more social networks to the guest ID, the binding giving the first user of the identity platform access to one or more profile attributes of the second user associated with the at least one social network user ID of the at least one social network of which the second user is a member.

\* \* \* \* \*